(12) United States Patent
Menyhart

(10) Patent No.: US 11,138,011 B2
(45) Date of Patent: Oct. 5, 2021

(54) DEVICE, DATA-PROCESSING CHAIN AND CONTEXT-SWITCHING METHOD

(71) Applicant: BULL SAS, Les Clayes-sous-Bois (FR)

(72) Inventor: Zoltan Menyhart, Grenoble (FR)

(73) Assignee: Bull SAS, Les Clayes sous-Bois (FR)

( * ) Notice: Subject to any disclaimer, the term of this patent is extended or adjusted under 35 U.S.C. 154(b) by 103 days.

(21) Appl. No.: 16/219,167

(22) Filed: Dec. 13, 2018

(65) Prior Publication Data
US 2019/0187991 A1 Jun. 20, 2019

(30) Foreign Application Priority Data
Dec. 14, 2017 (FR) ...................................... 1762134

(51) Int. Cl.
*G06F 9/30* (2018.01)
*G06F 9/54* (2006.01)
*G06F 9/46* (2006.01)
*G06F 9/48* (2006.01)

(52) U.S. Cl.
CPC ...... *G06F 9/30123* (2013.01); *G06F 9/30134* (2013.01); *G06F 9/461* (2013.01); *G06F 9/4881* (2013.01); *G06F 9/544* (2013.01)

(58) Field of Classification Search
None
See application file for complete search history.

(56) References Cited

U.S. PATENT DOCUMENTS

| 6,327,650 B1 * | 12/2001 | Bapst | G06F 9/3012 712/228 |
| 6,367,005 B1 * | 4/2002 | Zahir | G06F 9/3004 712/228 |
| 6,381,496 B1 * | 4/2002 | Meadows | A61N 1/36128 607/59 |

(Continued)

FOREIGN PATENT DOCUMENTS

| FR | 2 248 555 A1 | 5/1975 |
| GB | 1 489 930 A | 10/1977 |
| WO | WO 2004/015568 A2 | 2/2004 |

OTHER PUBLICATIONS

Preliminary Search Report as issued in French Patent Application No. 1762134, dated Aug. 29, 2018.

(Continued)

*Primary Examiner* — Hyun Nam
(74) *Attorney, Agent, or Firm* — ARC IP Law, PC; Joseph J. Mayo

(57) ABSTRACT

This data-processing device includes a unit for processing data, a storage memory and a buffer-memory device configured to contain a first group of data relative to a first context and exchange data between the processing unit and the first group of data. The buffer-memory device is further configured to contain a second group of data relative to a second context and, upon reception of a context-switching instruction, exchange data between the processing unit and the second group of data, in place of the first group of data. The data-processing device further includes a context- (Continued)

switching device configured to emit the context-switching instruction, select a group of data recorded in the storage memory, copy the first group of data to the storage memory and copy the selected group of data to the buffer-memory device.

9 Claims, 5 Drawing Sheets

(56) References Cited

U.S. PATENT DOCUMENTS

| | | | |
|---|---|---|---|
| 7,512,773 B1 | 3/2009 | Shebanow et al. | |
| 2004/0064589 A1 | 4/2004 | Boucher et al. | |
| 2008/0271042 A1* | 10/2008 | Musuvathi | G06F 11/3688 718/108 |
| 2010/0037034 A1* | 2/2010 | Balakrishnan | G06F 12/0215 711/221 |
| 2010/0153606 A1* | 6/2010 | Cottrell | G06F 9/4812 710/267 |
| 2011/0185127 A1 | 7/2011 | Theoduloz et al. | |
| 2012/0200579 A1* | 8/2012 | Hartog | G06F 9/4812 345/503 |
| 2013/0318347 A1* | 11/2013 | Moffat | H04L 9/0894 713/168 |
| 2018/0189063 A1* | 7/2018 | Fleming | G06F 9/3016 |

OTHER PUBLICATIONS

Hauser, J. R., et al., "Garp: a MIPS processor with a reconfigurable coprocessor," Field-Programmable Custom Computing Machines, Proceedings, the $5^{th}$ Annual IEEE Symposium on Napa Valley, Apr. 1997, XP010247463, pp. 24-33.

Callahan, T. J., et al., "The Garp Architecture and C Compiler," Computer, IEEE Computer Society, vol. 33, No. 4, Apr. 2000, XP000948675, pp. 62-69.

Tan, M., et al., "Multithreaded pipeline synthesis for data-parallel kernels," Computer-aided Design, IEEE Press, Nov. 2014, XP058062337, pp. 718-725.

\* cited by examiner

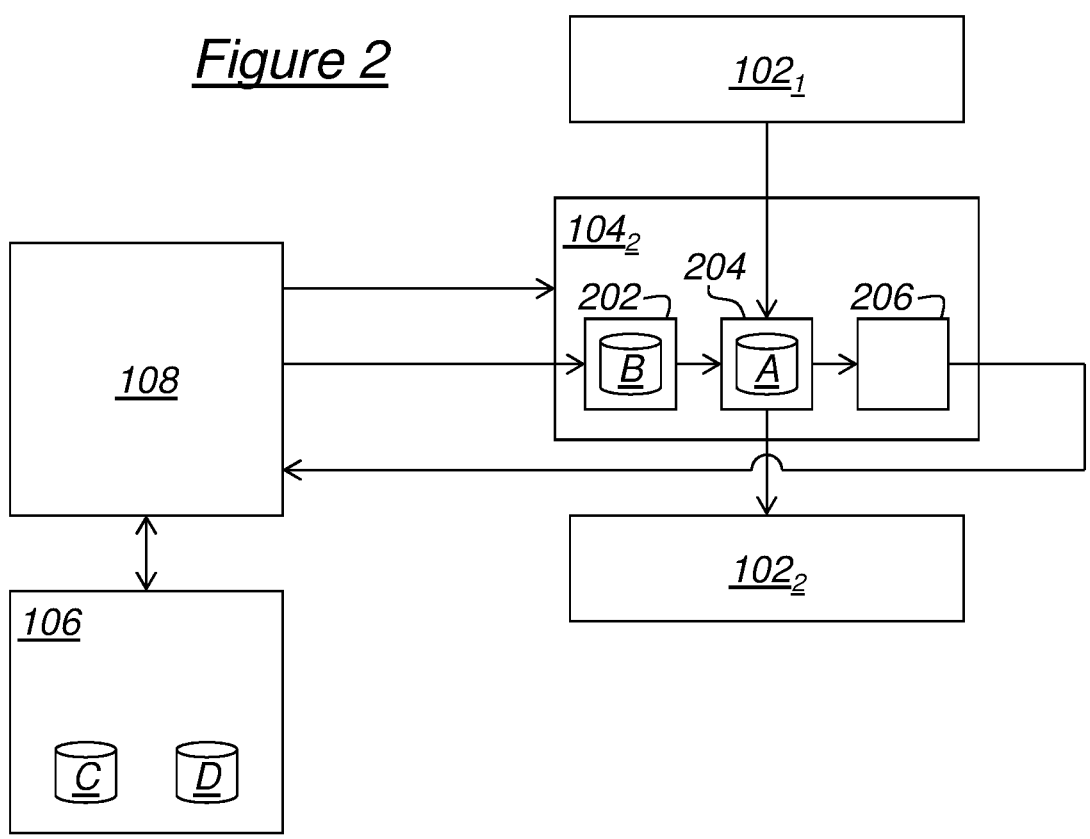
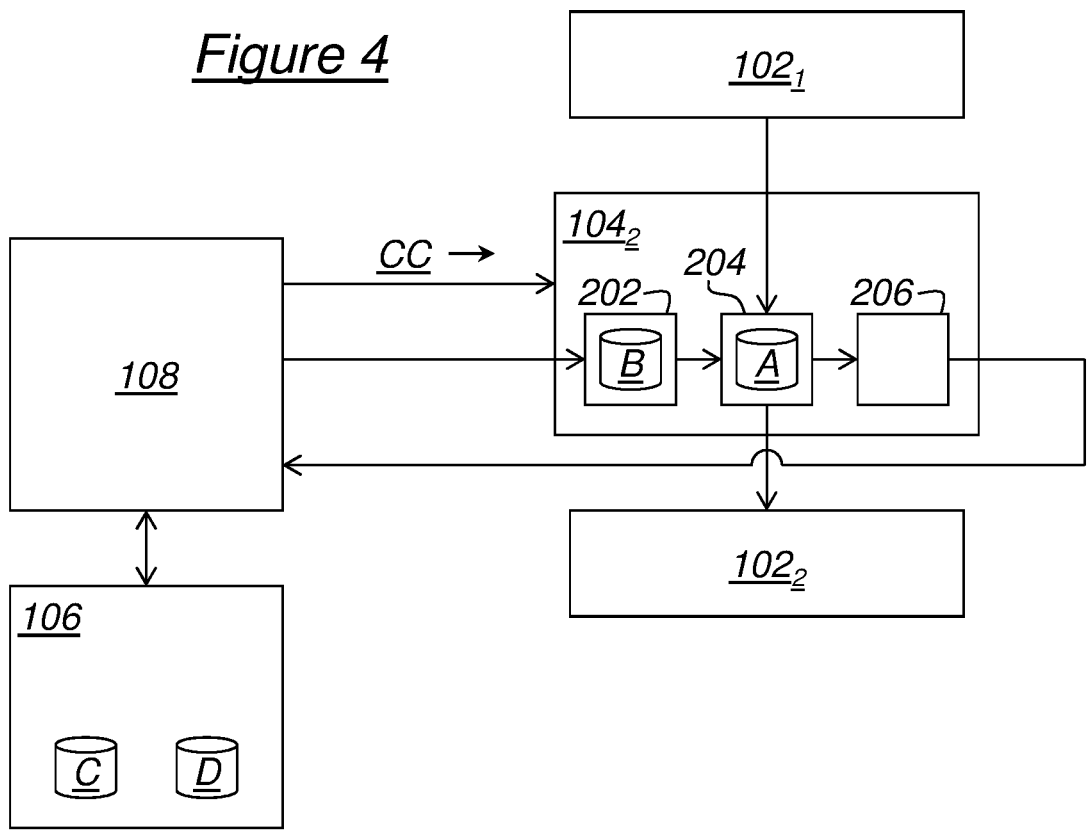

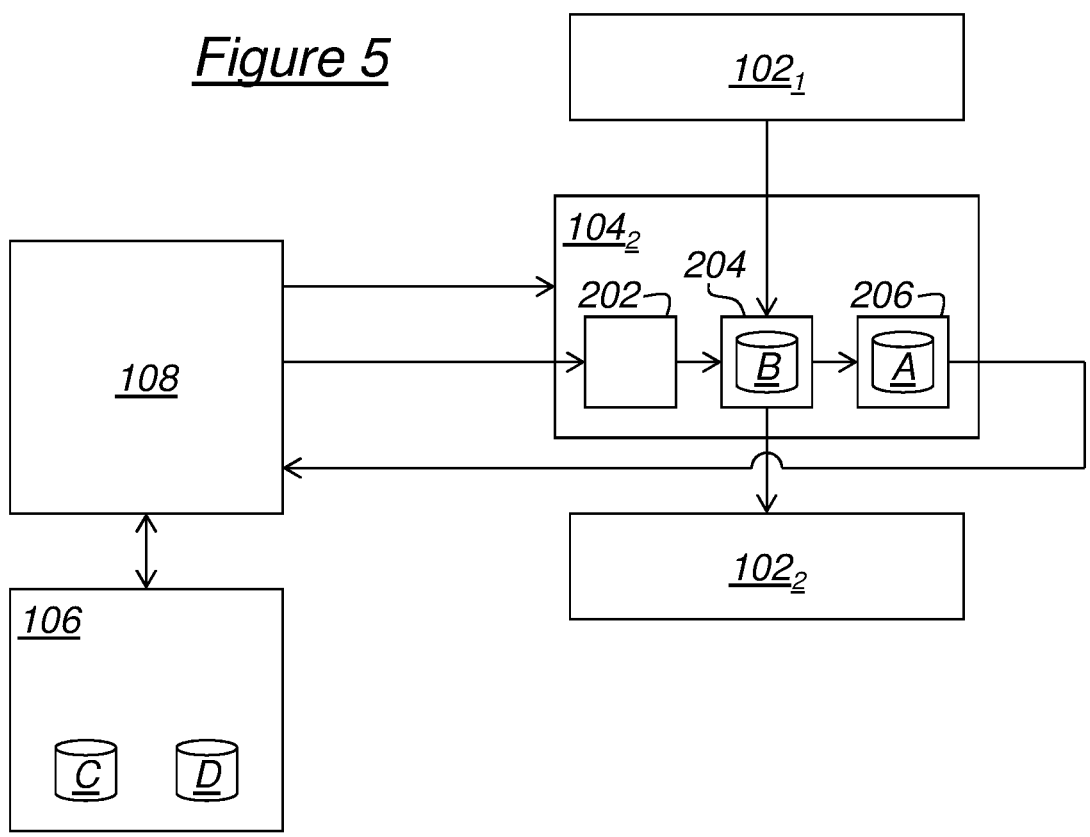
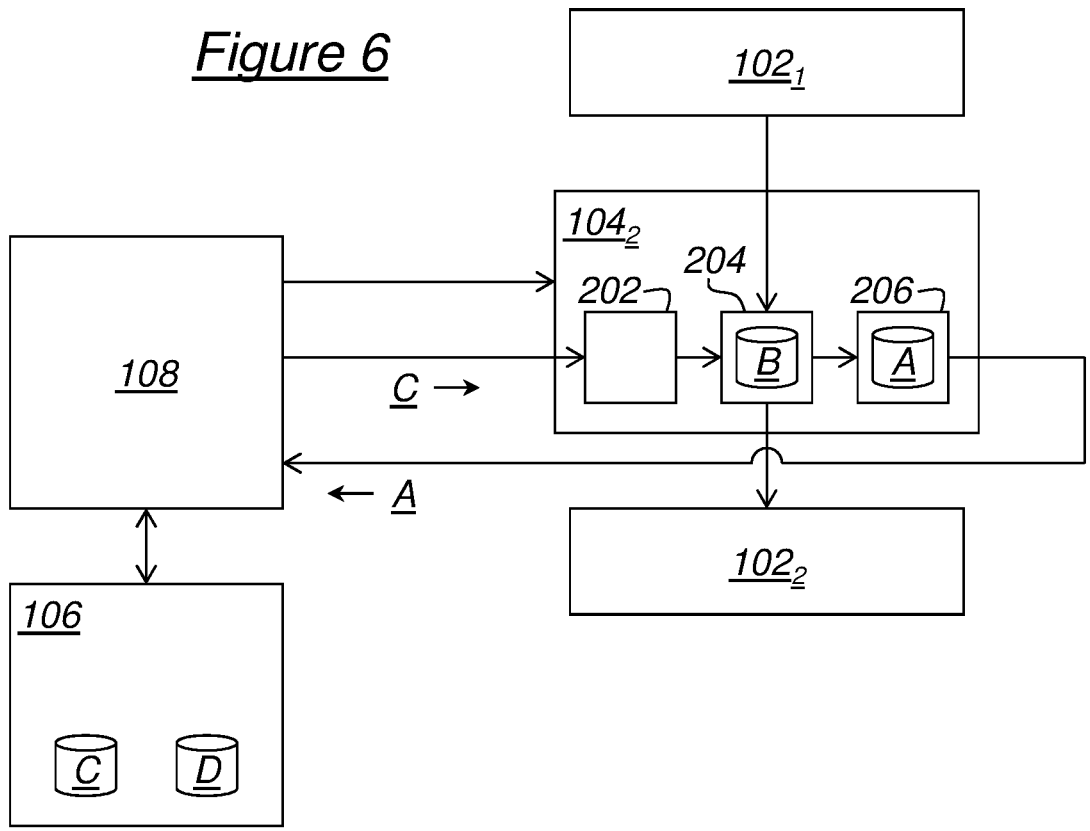

DEVICE, DATA-PROCESSING CHAIN AND CONTEXT-SWITCHING METHOD

CROSS-REFERENCE TO RELATED APPLICATIONS

This application claims priority to French Patent Application No. 1762134, filed Dec. 14, 2017, the entire content of which is incorporated herein by reference in its entirety.

FIELD

The present invention relates to a data-processing device, a data-processing chain and a method for context switching.

BACKGROUND

In the context of a data-processing device that includes a unit for data processing data, a storage memory in which groups of data relative to respective contexts are recorded, and a buffer-memory device connected to an input or to an output of the processing unit in order to exchange data with it, the buffer-memory device being designed to contain a first group of data, relative to a first context, and exchange data between the processing unit and the first group of data, the American patent published under the number U.S. Pat. No. 7,512,773 B1, describes a buffer-memory device that comprises a single local buffer memory. Thus, in order to carry out a context switch to a second group of data, it is necessary to copy the first group of data from the local buffer memory to the storage memory, then copy the second group of data from the storage memory to the local buffer memory. It is only after these two operations that the context switching is effective.

However, the storage memory records the groups of data associated with all the buffer-memory devices of a processing chain for all the contexts on standby. Thus, the storage memory must be of a large size, so that the reading and writing operations to or from this memory are relatively slow. Thus, the context switching is slow.

It can thus be desired to provide a data-processing device that allows to overcome at least some of the aforementioned problems and constraints.

SUMMARY

Various aspects of the invention apply to a data-processing device, of the type comprising:
  a unit for processing data,
  a storage memory in which groups of data relative to respective contexts are recorded,
  a buffer-memory device connected to an input or to an output of the processing unit in order to exchange data with it, the buffer-memory device being configured to:
    contain a first group of data, relative to a first context,
    exchange data between the processing unit and the first group of data.

An aspect of the invention is directed to a data-processing device of the aforementioned type, wherein the buffer-memory device is further configured to:
  contain a second group of data relative to a second context,
  upon reception of a context-switching instruction, exchange data between the processing unit and the second group of data, in place of the first group of data,
and wherein the buffer-memory further comprises a context-switching device configured to:
  emit the context-switching instruction to the buffer-memory device,
  select one of the groups of data recorded in the storage memory,
  copy the first group of data, from the buffer-memory device, to the storage memory,
  copy the selected group of data, from the storage memory, to the buffer-memory device.

The context switching is carried out locally, in the buffer-memory device and between the two groups of data that it contains. Thus, the buffer-memory device only needs to contain two groups of data and can be optimized in order to carry out the context switching very quickly. It is only later that the exchanges with the storage memory are carried out. Thus, the slowness of the latter does not affect the speed of context switching, which can therefore be carried out quickly.

Optionally:
  the buffer-memory device comprises a first, a second and a third local memory in each of which a group of data is intended to be recorded,
  the first memory is connected to the processing unit in order to allow the exchange of data between the group of data that it contains and the processing unit,
  in response to the reception of the context-switching instruction, the buffer-memory device is configured to:
    copy the first group of data, from the second local memory, to the third local memory,
    copy the second group of data, from the first local memory, to the second local memory, in place of the first group of data,
  the context-switching device is further configured to:
    copy the first group of data, from the third local memory, to the storage memory,
    copy the selected group of data, from the storage memory, to the first local memory.

Also optionally, the buffer-memory device comprises a shift register including the three local memories.

Also optionally:
  the buffer-memory device comprises a first and a second local memory in each of which a group of data is intended to be recorded, and a selector circuit configured to selectively connect each of the context-switching device and the processing unit to one of, respectively, the first and the second local memory,
  before the reception of the context-switching instruction, the first group of data is recorded in the second local memory and the second group of data is recorded in the first local memory, and the selector circuit connects the second local memory to the processing unit,
  upon reception of the context-switching instruction, the buffer-memory device is configured to configure the selector circuit in such a way as to:
    connect the processing unit to the first local memory,
    connect, in reading mode, the context-switching device to the second local memory,
  the context-switching device is further configured to:
    copy the first group of data, from the second local memory, to the storage memory.

Also optionally:
  upon reception of the context-switching instruction, the buffer-memory device is configured to configure the selector circuit in such a way as to connect, in reading mode and in writing mode, the context-switching device to the second local memory, and
  the context-switching device is further configured to copy the selected group of data, from the storage memory, to the second local memory, after the first group of data has been copied, from the second local memory, to the storage memory.

Also optionally:
the buffer-memory device comprises a third local memory in which a group of data is intended to be recorded,
the selector circuit is configured to selectively connect each of the context-switching device and the processing unit to one of, respectively, the first, the second and the third local memory,
upon reception of the context-switching instruction, the buffer-memory device is configured to configure the selector circuit in such a way as to connect, in writing mode, the context-switching device to the third local memory,
the context-switching device is further configured to copy the selected group of data, from the storage memory, to the third local memory, at the same time as the first group of data is copied, from the second local memory, to the storage memory.

Also optionally, the selector circuit is configured to implement a mechanism for renaming the material objects.

An aspect of the invention is also directed to a data-processing chain comprising a plurality of data-processing devices, each according to the invention.

Optionally, the storage memory and/or the context-switching device are shared by the data-processing devices.

An aspect of the invention is also directed to a method for context-switching in a data-processing device comprising:
a data-processing unit,
a storage memory in which groups of data relative to respective contexts are recorded,
a buffer-memory device connected to an input or to an output of the processing unit in order to exchange data with it, the buffer-memory device containing a first and a second group of data relative to respective contexts,
the method including:
the exchange of data between the processing unit and the first group of data,
upon reception of a context-switching instruction, the exchange of data between the processing unit and the second group of data, in place of the first group of data,
the selection of one of the groups of data recorded in the storage memory,
the copying of the first group of data, from the buffer-memory device, to the storage memory,
the copying of the selected group of data, from the storage memory, to the buffer-memory device.

BRIEF DESCRIPTION OF THE DRAWINGS

The invention will be better understood with the help of the following description, given only as an example and made in reference to the appended drawings, in which:

FIGS. 4 to 7 are views similar to that of FIG. 2, illustrating the operations carried out during a context switch, FIG. 8 schematically shows the overall structure of a data-processing device according to a second embodiment of the invention, as well as other elements of the processing chain of FIG. 1, and FIGS. 9 and 10 are views similar to that of FIG. 8, illustrating the operations carried out during a context switch.

DETAILED DESCRIPTION

Figure 1:
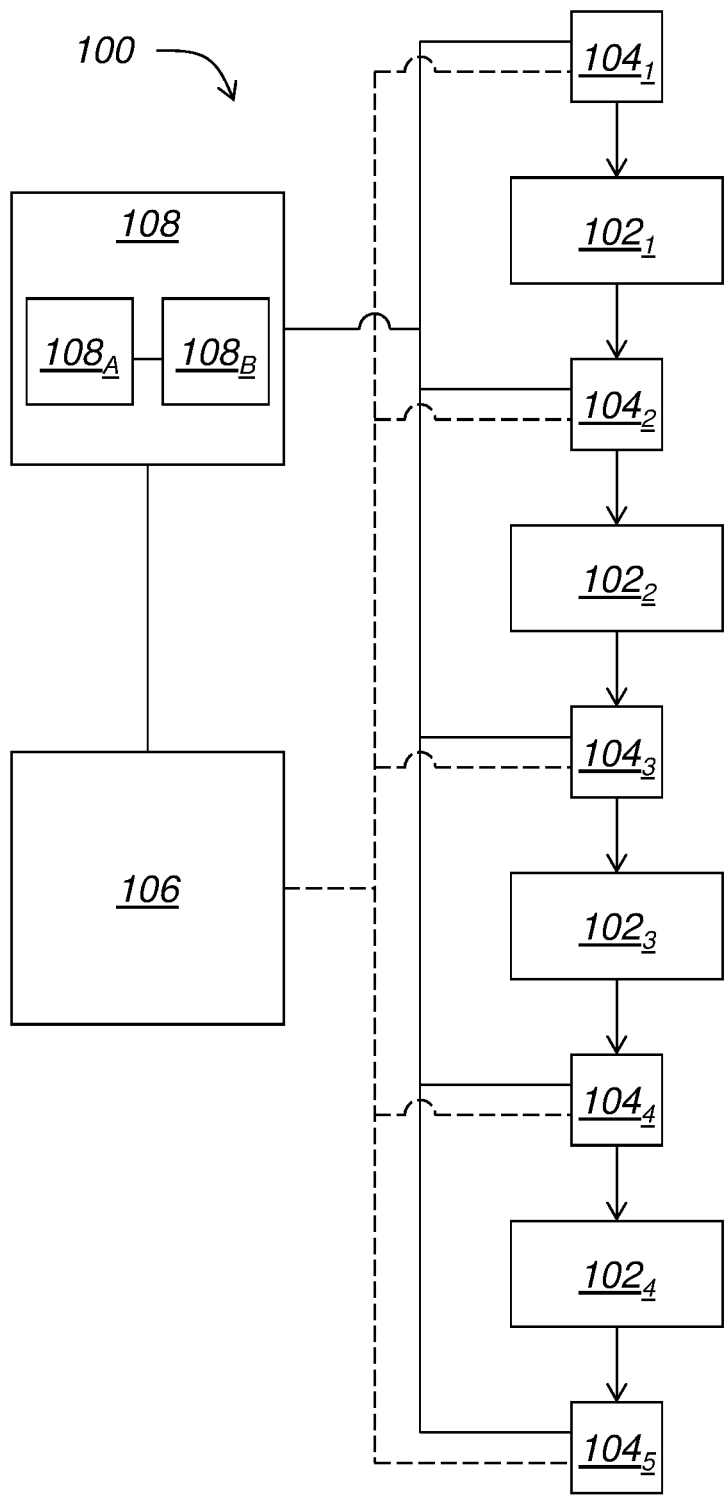
FIG. 1 schematically shows the overall structure of a data-processing chain, according to an embodiment of the invention, FIG. 2 schematically shows the overall structure of a data-processing device according to a first embodiment of the invention, as well as other elements of the processing chain of FIG. 1.

In reference to FIG. 1, a data-processing chain 100 implementing the invention will now be described. The processing chain 100 is for example intended to be implemented in a computer system.

The processing chain 100 comprises data-processing units $102_1 \ldots 102_4$ each having an input configured to receive data to be processed and an output configured to provide the processed data. In the example described, the processing units $102_1 \ldots 102_4$ form a linear processing path. However, in other embodiments, the processing path could be nonlinear and could comprise for example forks.

The processing units $102_1 \ldots 102_4$ carry out the desired processings on the data, in a generally very rapid manner, but they do not store the data. The processing units $102_1 \ldots 102_4$ are desirably without a "state" so that the data processed before does not affect the processing of the current data.

Since the speed of processing of the data can vary from one processing unit to another, the processing chain 100 further comprises buffer-memory devices $104_1 \ldots 104_5$ each connected to an input and/or an output of one of the processing units $102_1 \ldots 102_4$. Each buffer-memory device $104_1 \ldots 104_5$ is configured, when it is connected to the input of a processing unit, to provide data to this processing unit and, when it is connected to an output of a processing unit to receive data from this processing unit. In the example described, a buffer-memory device $104_2$, $104_3$, $104_4$ is interposed between every two consecutive processing units along the processing path, that is to say that it is connected to the output of the first and to the input of the second. Moreover, in the example described, one buffer-memory device $104_1$ is connected to the input of the first processing unit $102_1$ of the processing path, and another $104_5$ is connected to the output of the last processing unit $102_4$ of the processing path. Thus, the buffer-memory devices $104_1 \ldots 105_5$ allow to balance and smooth the stream of the data.

A processing unit $102_1 \ldots 102_4$ does not start taking data at the input if it does not have all the resources necessary to accomplish its task (for example if the processing unit must access remote data recorded in a storage device not shown) or if there is no space in the buffer-memory device connected at the output in order to record the processed data. The processing chain 100 is then blocked.

The processing chain 100 can be shared between a plurality of tasks, for example executed by respective computer programs. The processing chain 100 is thus used alternatively by these tasks. In order for a task to not monopolize the processing chain 100 for too long, it is intended to switch from time to time from one task to another.

In order to switch from the current task to the next task, it is therefore needed to save the data relative to the current task contained in the buffer-memory devices and exchange it with the data relative to the following task in order for the processing units to work with this new data. This operation is called a context switch.

According to an embodiment of the invention, each buffer-memory device $104_1 \ldots 104_5$ is configured to contain a plurality of groups of data, relative to respective contexts, in an embodiment only two groups of data. It is further configured to exchange data between each processing unit to which it is connected and one of the groups of data that it contains, called current group of data. It is further configured, upon reception of a context-switching instruction, to switch to another group of data that it contains, which becomes the new current group of data. Thus, after the context switch, the data is exchanged between each processing unit to which the buffer-memory device is connected and this new current group of data.

In an embodiment, the groups of data are managed according to the first in, first out rule. ("First In First Out" or FIFO).

The processing chain 100 further comprises a storage memory 106 in which, for each buffer-memory device $104_1 \ldots 104_5$, groups of data relative to respective contexts other than those already contained in the buffer-memory devices $104_1 \ldots 104_5$ are recorded.

The processing chain 100 further comprises a context-switching device 108 configured to emit the context-switching instruction to all the buffer-memory devices $104_1 \ldots 104_5$.

The context-switching device 108 is further configured, after each buffer-memory device $104_1 \ldots 104_5$ has changed the current group of data, to copy the old current group of data, from the buffer-memory device $104_1 \ldots 104_5$ considered, to the storage memory 106.

The context-switching device 108 is further configured to, on the one hand, select the groups of data, recorded in the storage memory, relative to the same context and respectively associated with the buffer-memory devices $104_1 \ldots 104_5$, and, on the other hand, after each buffer-memory device $104_1 \ldots 104_5$ has changed the current group of data, to copy them, from the storage memory 106, to the buffer-memory device $104_1 \ldots 104_5$, respectively. Thus, during the next context switch, the buffer-memory devices $104_1 \ldots 104_5$ will respectively be able to switch to the selected groups of data relative to one and the same new context.

The context-switching device 108 is for example implemented in the form of a computer system comprising a processor 108A and a memory 108B in which a computer program comprising instructions intended to be executed by the processor 108A for the carrying out of the functions of the context-switching device 108 is recorded.

Alternatively, all or a part of these functions could be microprogrammed or microwired in dedicated integrated circuits. Thus, alternatively, the context-switching device 108 could be carried out by an electronic device composed only of digital circuits (without a computer program) for carrying out the same functions.

In reference to FIG. 2, a first example of an embodiment according to the invention of the buffer-memory devices $104_1 \ldots 104_5$ will now be described. In FIG. 2, only the buffer-memory device $104_2$ is illustrated, given that the others are identical. The buffer-memory device $104_2$ comprises a shift register comprising a first, a second and a third local memory 202, 204, 206 configured to respectively contain three groups of data. The shift register is further configured, upon reception of the context-switching instruction, to copy the contents of the second local memory 204 into the third local memory 206 and the contents of the first local memory 202 into the second local memory 204. These two copies are made simultaneously and are thus very rapid.

The first and third local memory 202, 206 are further connected to the context-switching device 108 in order for the latter to be able to write to the first local memory 202 and read from the third local memory 206.

In reference to FIG. 3, a context-switching method 300 according to an embodiment of the invention and implemented in the processing chain 100, in the buffer-memory device $104_2$, will now be described. Similar methods are implemented for the other buffer-memory devices $104_1$, $104_3$, $104_4$, $104_5$.

In the rest of the description, a group of data relative to a context X, will be called group of data X in order to simplify.

Initially, two groups of data A, B are respectively recorded in the second local memory 204 and in the first local memory 202. Two other groups of data C, D are recorded in the storage memory 106. Thus, during an initial step 301, illustrated in FIG. 2, the processing units $102_1$, $102_2$ exchange data with the group of data A, which is therefore the current group of data.

Figure 3:
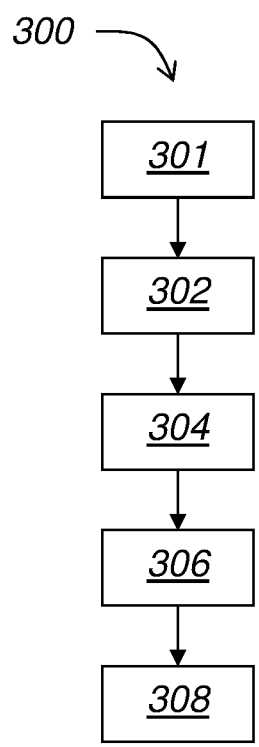
FIG. 3 illustrates the successive steps of a context-switching method, according to an embodiment of the invention.

Again in FIG. 3, during a step 302 illustrated in FIG. 4, the context-switching device 108 sends a context-switching instruction CC to all the buffer-memory devices $104_1$, $104_2$, $104_3$, $104_4$, $104_5$ and thus in particular to the buffer-memory device $104_2$.

Again in FIG. 3, during a step 304 illustrated in FIG. 5, upon reception of the context-switching instruction CC, the buffer-memory device $104_2$ changes the current group of data, by going from the group of data A to the group of data B. For this, the contents of the second local memory 204 are copied into the third local memory 206 and the contents of the first local memory 202 are copied into the second local memory 204. Thus, the group of data B is located in the second local memory 204 in such a way that data is exchanged between the processing units $102_1$, $102_2$ and the group of data B, in place of the group of data A.

Again in FIG. 3, during a step 306, the context-switching device 108 selects a context to which to switch during the next switch, the data of this context being recorded in the storage memory 106. Thus, for the buffer-memory device $104_2$, the context-switching device 108 selects the group of data relative to the selected context and associated with the buffer-memory device $104_2$. In the example described, the context-switching device 108 selects, out of the context C and the context D available, the context C and, more particularly, for the buffer-memory device $104_2$, the group of data C.

For the previous steps 302 and 306, the decision to switch context and the selection of the context are carried out by the context-switching device 108 according to a predetermined strategy, for example one of the following: a context is processed until it is blocked, then the next context is taken in the order of request to access the processing chain 100; the context-switching device 108 forces the context switch even if there is no blockage in order to give a chance to the other contexts ("shared time" strategy); each context is associated with a priority and the context with the highest priority is selected; the context having used the processing chain 100 for the least amount of time is selected ("fair treatment" strategy). Moreover, in an embodiment, the selected context is chosen from the contexts called "ready" that is to say which meet the following criteria: there is data in this context that is ready to be processed; the material resources for the processing are available; there is room to store the processed data.

Figure 7:
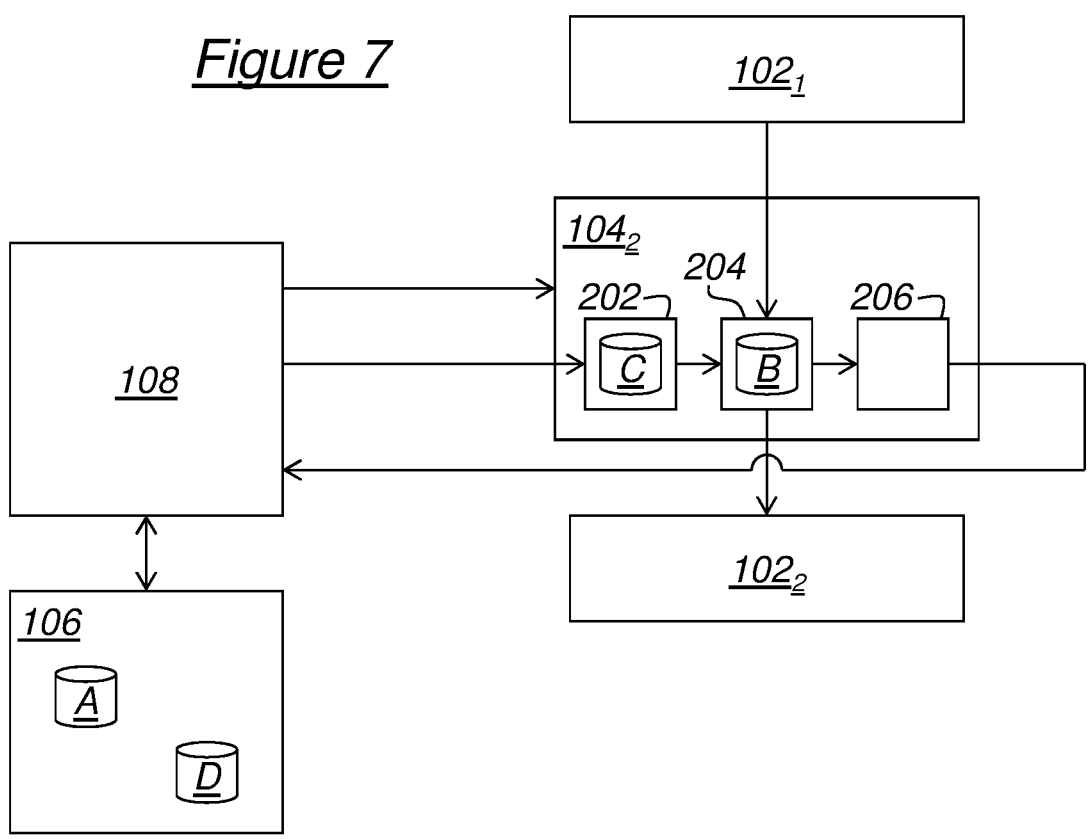

During a step 308 illustrated in FIG. 6, the context-switching device 108 copies the group of data A, from the buffer-memory device $104_2$, to the storage memory 106, and the group of data C, from the storage memory 106, to the first local memory 202. In an embodiment, these copying operations are carried out in parallel to the exchanges of data between the group of data B and the processing units 102₁, 102₂ in such a way as to not interrupt the stream of data processing. The result is illustrated in FIG. 7. It is noted that this is a configuration similar to that of FIG. 2. The method 300 can thus begin again when a new context switch is decided on.

Thus, it is clear that the context switch from the context A to the context B can be made very quickly since it is carried out in the buffer-memory device 104₂ that is optimized for this operation. The operations of copying from and to the storage memory 106, which are generally slow, are carried out later, which does not affect the quickness of the context switching.

Figure 8:
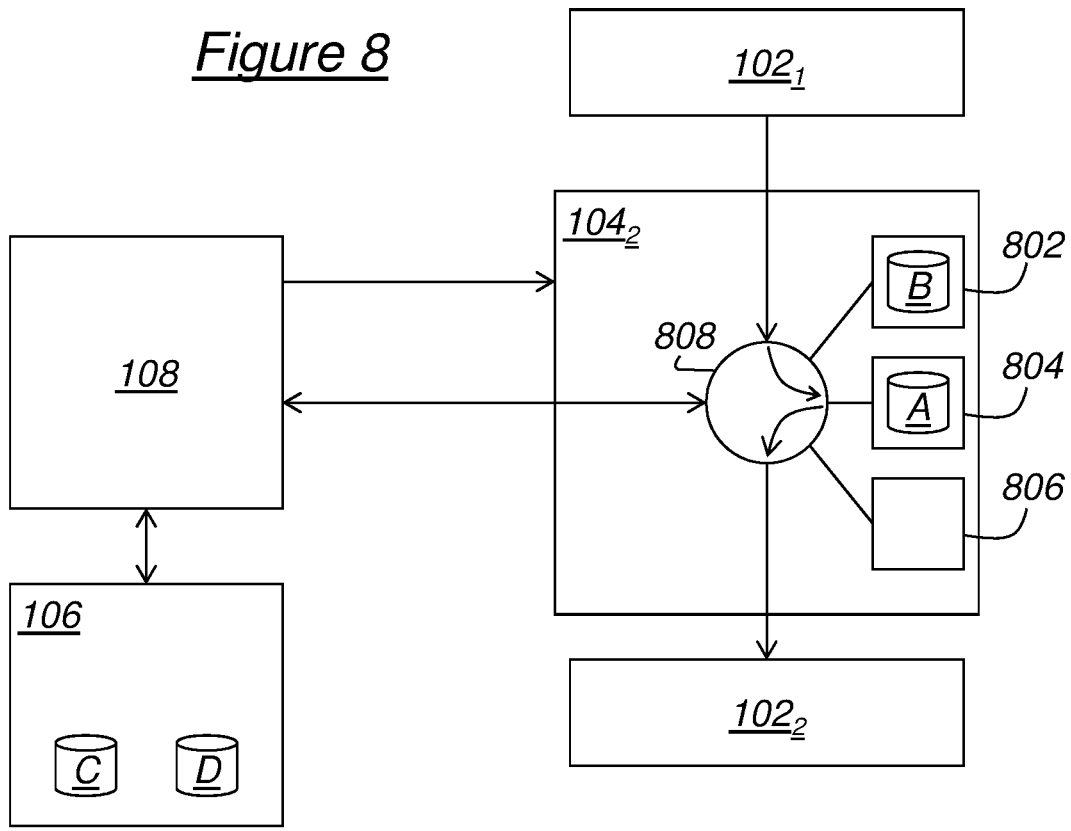

In reference to FIG. 8, a second example of an embodiment according to the invention of the buffer-memory devices 104₁ ... 104₅ will now be described. In FIG. 8, only the buffer-memory device 104₂ is illustrated, given that the others are identical.

The buffer-memory device 104₂ comprises a first, a second and a third local memory 802, 804, 806 and a selector circuit 808 connected to these local memories 802, 804, 806, to the processing units 102₁, 102₂ and to the context-switching device 108. The selector circuit 808 is configured to connect each of the processing units 102₁, 102₂ and the context-switching device 108 to one of the respective local memories 802, 804, 806. This connection uses for example the technique of "renaming the material objects". The establishment of these connection is very rapid.

The context-switching method 300 also applies to this embodiment, with the differences that will now be described in detail.

Initially, as illustrated in FIG. 8, the groups of data A, B are recorded in the second local memory 804 and in the first local memory 802, respectively. The selector circuit 808 is configured in order for the processing units 102₁, 102₂ to be both connected to the second local memory 804 in order to exchange data.

Figure 9:
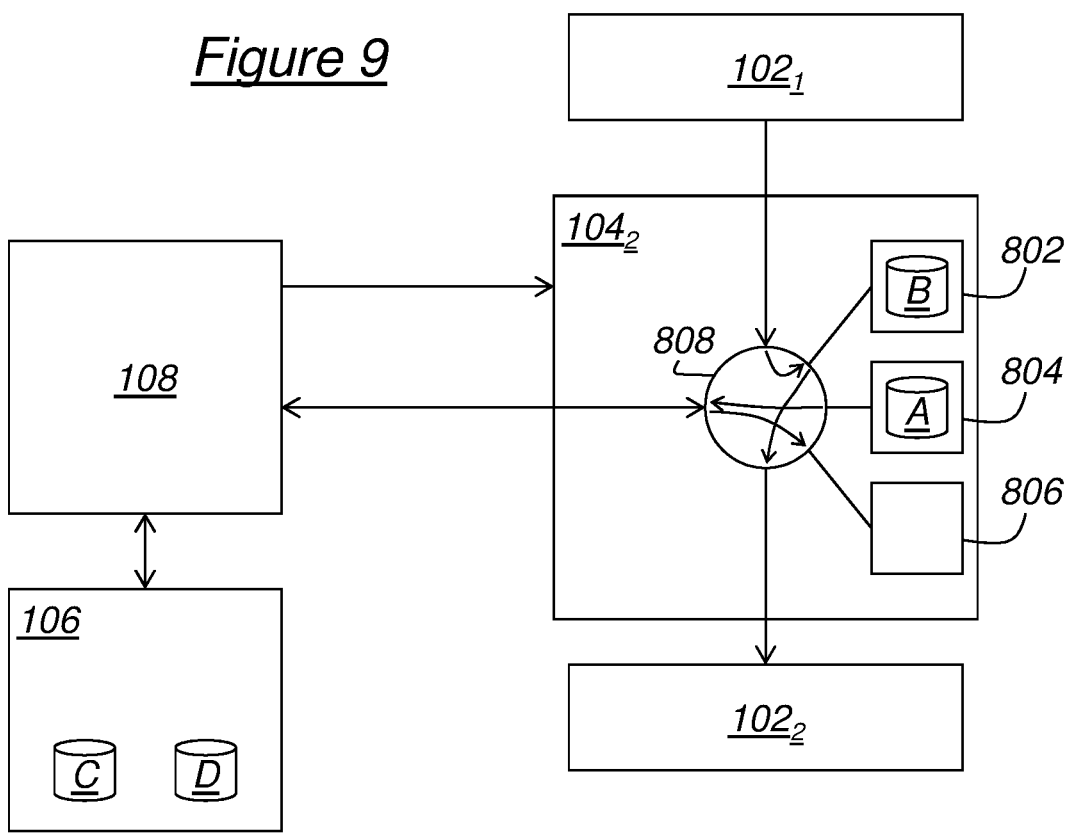

During the step 304, the result of which is illustrated in FIG. 9, upon reception of the context-switching instruction CC, the buffer-memory device 104₂ configures the selector circuit 808 in such a way that the processing units 102₁, 102₂ are connected to the first local memory 802 in order to exchange data with the group of data B. Moreover, the buffer-memory device 104₂ configures the selector circuit 808 in such a way that the context-switching device 108 is connected in reading mode to the second local memory 804 (in order to read its contents) and in writing mode to the third local memory 806 (in order to write therein). The connections that the selector circuit 808 must establish are for example indicated in the context-switching instruction CC.

Figure 10:
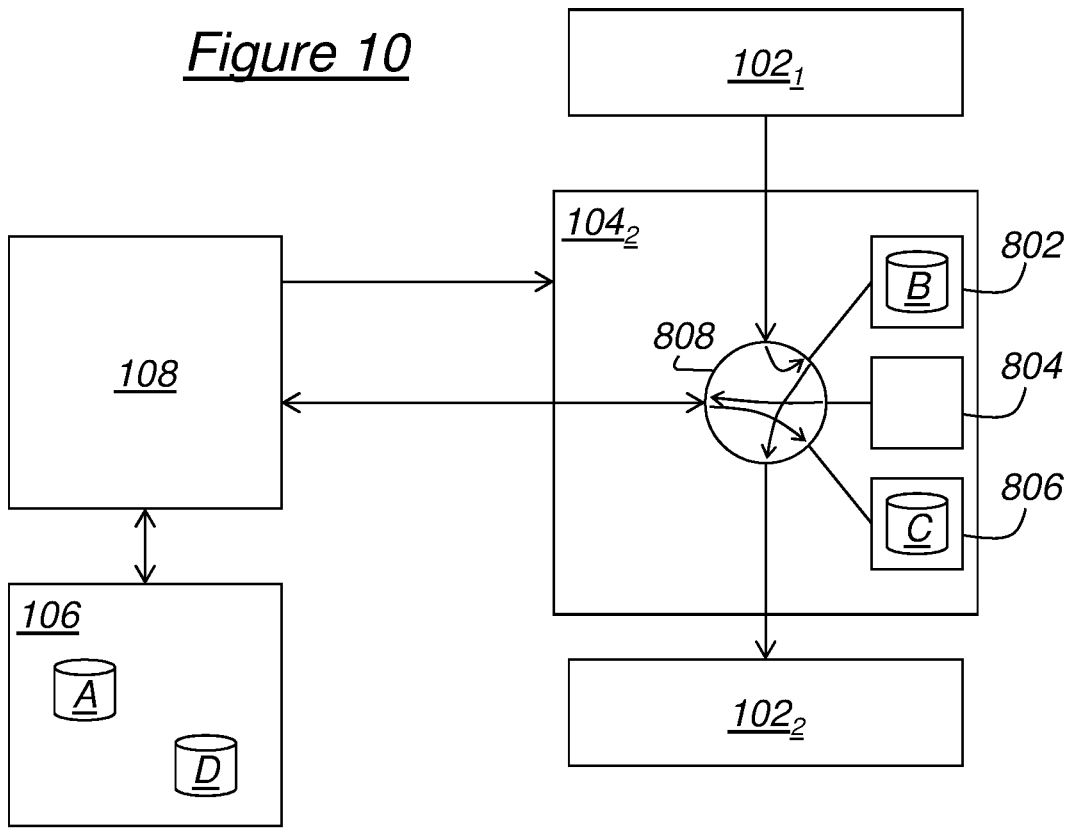

During the step 308, the result of which is illustrated in FIG. 10, the context-switching device 108 copies the group of data A, from the second local memory 804, to the storage memory 106, and the group of data C, from the storage memory 106, to the third local memory 806. In an embodiment, these two copying operations are carried out at the same time which is possible since three local memories are provided. Alternatively, the two copying operations could be carried out one after the other. In this case, it is possible to not need the third local memory 806 by copying the group of data C into the second local memory 804 in place of the group of data A, after the latter has been copied into the storage memory 106.

Again, it is clear that the context switch from the context A to the context B can be carried out very quickly since it is carried out in the buffer-memory device 104₂ which is optimized for this operation. The operations of copying from and to the storage memory 106, which are generally slow, can be carried out later, which does not affect the quickness of the context switching.

Moreover, it will be noted that the invention is not limited to the embodiments described above. It is clear indeed to a person skilled in the art that various modifications can be made to the embodiments described above, in light of the teaching that has just been disclosed to them. In the following claims, the terms used must not be interpreted as limiting the claims to the embodiments disclosed in the present description, but must be interpreted to include therein all the equivalents that the claims aim to cover due to their wording and the providing of which is within the reach of a person skilled in the art by applying their general knowledge to the implementation of the teaching that has just been disclosed to them.

The invention claimed is:

1. A data-processing device comprising:
   a data processing unit for processing data,
   a storage memory in which groups of data relative to respective contexts are recorded,
   a buffer-memory device connected to the storage memory and connected to an input or to an output of the data processing unit in order to exchange data with it,
      the buffer-memory device being configured to:
         contain a first group of data, relative to a first context,
         exchange data between the data processing unit and the first group of data,
      wherein the buffer-memory device is further configured to:
         contain a second group of data, relative to a second context,
         upon reception of a context-switching instruction, exchange data between the data processing unit and the second group of data, in place of the first group of data,
   and wherein the data-processing device further comprises a context-switching device configured to:
      emit the context-switching instruction to the buffer-memory device,
      select one of the groups of data recorded in the storage memory as a selected group of data,
      copy the first group of data, from the buffer-memory device, to the storage memory,
      copy the selected group of data, from the storage memory, to the buffer-memory device; and,
   wherein
      the buffer-memory device comprises a first local memory and a second local memory in each of which a group of data is configured to be recorded, and a selector circuit configured to selectively connect each of the context-switching device and the data processing unit to one of, respectively, the first local memory and the second local memory,
      before the reception of the context-switching instruction, the first group of data is recorded in the second local memory and the second group of data is recorded in the first local memory, and the selector circuit connects the second local memory to the data processing unit, upon reception of the context-switching instruction, the buffer-memory device is configured to configure the selector circuit in such a way as to:
  connect the data processing unit to the first local memory,
  connect, in reading mode, the context-switching device to the second local memory,
the context-switching device is further configured to copy the first group of data, from the second local memory, to the storage memory.

2. The data-processing device as claimed in claim 1, wherein:
upon reception of the context-switching instruction, the buffer-memory device is configured to configure the selector circuit in such a way as to connect, in reading mode and in writing mode, the context-switching device to the second local memory, and
the context-switching device is further configured to copy the selected group of data, from the storage memory, to the second local memory, after the first group of data has been copied, from the second local memory, to the storage memory.

3. The data-processing device as claimed in claim 1, wherein:
the buffer-memory device comprises a third local memory in which the group of data is configured to be recorded,
the selector circuit is configured to selectively connect each of the context-switching device and the data processing unit to one of, respectively, the first local memory, the second local memory and the third local memory,
upon reception of the context-switching instruction, the buffer-memory device is configured to configure the selector circuit in such a way as to connect, in writing mode, the context-switching device to the third local memory,
the context-switching device is further configured to copy the selected group of data, from the storage memory, to the third local memory, concurrently as the first group of data is copied, from the second local memory, to the storage memory.

4. The data-processing device as claimed in claim 1, wherein the selector circuit is configured to implement a mechanism for renaming material objects.

5. A data-processing chain comprising a plurality of data processing units, and plurality of buffer-memory devices each as claimed in claim 1 and wherein each buffer-memory device receives the context-switching instruction simultaneously and switches between the first context and the second context across all of the plurality of buffer-memory devices simultaneously.

6. The data-processing chain as claimed in claim 5, wherein the storage memory and/or the context-switching device are shared by the plurality of data processing units.

7. The data-processing device of claim 1 wherein the selector circuit comprises a pointer to the first local memory and the second local memory or a shift register coupled to the first local memory or the second local memory to connect the data processing unit to the first local memory or the second local memory.

8. A data-processing device comprising:
a data processing unit for processing data,
a storage memory in which groups of data relative to respective contexts are recorded,
a buffer-memory device connected to an input or to an output of the data processing unit in order to exchange data with it,
  the buffer-memory device being configured to:
    contain a first group of data, relative to a first context,
    exchange data between the data processing unit and the first group of data,
  wherein the buffer-memory device is further configured to:
    contain a second group of data, relative to a second context,
    upon reception of a context-switching instruction, exchange data between the data
    processing unit and the second group of data, in place of the first group of data,
and wherein the data-processing device further comprises a context-switching device configured to:
  emit the context-switching instruction to the buffer-memory device,
  select one of the groups of data recorded in the storage memory as a selected group of data,
  copy the first group of data, from the buffer-memory device, to the storage memory,
  copy the selected group of data, from the storage memory, to the buffer-memory device; and,
wherein
  the buffer-memory device comprises three local memories comprising a first local memory, a second local memory and a third local memory in each of which a group of data is configured to be recorded,
  the first local memory is connected to the data processing unit to allow exchange of data between the group of data that it contains and the data processing unit,
  in response to the reception of the context-switching instruction, the buffer-memory device is configured to:
    copy the first group of data, from the second local memory, to the third local memory,
    copy the second group of data, from the first local memory, to the second local memory, in place of the first group of data,
  wherein the context-switching device is further configured to:
    copy the first group of data, from the third local memory, to the storage memory,
    copy the selected group of data, from the storage memory, to the first local memory.

9. The data-processing device as claimed in claim 8, wherein the buffer-memory device comprises a shift register including the three local memories.

* * * * *